(12) United States Patent
Miki et al.

(10) Patent No.: US 8,452,820 B2
(45) Date of Patent: May 28, 2013

(54) LOGICAL PARTITION CONFIGURATION DATA FILE CREATION

(75) Inventors: Yukari Miki, Yamato (JP); Tomohiro Miyahira, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/867,734

(22) PCT Filed: Oct. 3, 2008

(86) PCT No.: PCT/JP2008/068083
§ 371 (c)(1),
(2), (4) Date: Nov. 12, 2010

(87) PCT Pub. No.: WO2009/044876
PCT Pub. Date: Apr. 9, 2009

(65) Prior Publication Data
US 2011/0047157 A1    Feb. 24, 2011

(30) Foreign Application Priority Data
Oct. 5, 2007    (JP) ................................ 2007-262388

(51) Int. Cl.
*G06F 12/00*    (2006.01)
*G06F 12/02*    (2006.01)

(52) U.S. Cl.
USPC ............................ 707/812; 707/822; 711/173

(58) Field of Classification Search
USPC ................. 707/737, 812, 822, 968, 640, 641, 707/659; 711/162, 165, 163, 173
See application file for complete search history.

(56) References Cited

U.S. PATENT DOCUMENTS

| 6,014,669 | A  | * | 1/2000  | Slaughter et al. | ............. 707/610 |
| 7,155,534 | B1 | * | 12/2006 | Meseck et al.    | ................ 709/238 |
| 7,213,115 | B2 | * | 5/2007  | Sato et al       | ...................... 711/162 |

(Continued)

FOREIGN PATENT DOCUMENTS

| JP | 2004013522 | 1/2004 |
| JP | 2006127398 | 5/2006 |

OTHER PUBLICATIONS

"EP Application No. 08835765.2 Extended Search Report", Nov. 26, 2012, 8 pages.

(Continued)

*Primary Examiner* — Hung T Vy
(74) *Attorney, Agent, or Firm* — DeLizio Gilliam, PLLC

(57) ABSTRACT

To reduce the trouble required for creating and editing configuration data composed of pairs of an element names and element values. The system includes a file storage unit 120 storing a configuration data file describing pairs of element names and element values concerning respective predetermined elements; a reception unit 110 receiving a creation instruction of configuration data designating a predetermined configuration data file stored in the file storage unit 120 and an operation method; an operation unit 130 reading out the configuration data file designated by the creation instruction from the file storage unit 120, conducting an operation with respect to the element value for each element of the configuration data file in accordance with the operation method designated by the creation instruction, and creating a new configuration data file in which, for each respective elements, a pair of an element name which is identical to the one in the original configuration data file and an element value resulted from an operation is described; and an output unit 150 outputting the new configuration data created by the operation unit 130.

19 Claims, 6 Drawing Sheets

U.S. PATENT DOCUMENTS

| | | | | |
|---|---|---|---|---|
| 7,296,182 | B2 * | 11/2007 | Greenspan et al. | 714/13 |
| 7,464,152 | B2 * | 12/2008 | Ishizaki et al. | 709/223 |
| 7,779,404 | B2 * | 8/2010 | Movassaghi et al. | 717/171 |
| 2003/0023707 | A1 * | 1/2003 | Ryan | 709/220 |
| 2003/0055933 | A1 * | 3/2003 | Ishizaki et al. | 709/223 |
| 2003/0061262 | A1 * | 3/2003 | Hahn et al. | 709/104 |
| 2004/0210792 | A1 * | 10/2004 | Foster et al. | 714/5 |
| 2005/0223009 | A1 * | 10/2005 | Powers et al. | 707/9 |
| 2005/0235281 | A1 * | 10/2005 | Lefrancois | 717/175 |
| 2005/0281095 | A1 * | 12/2005 | Eilert et al. | 365/189.12 |
| 2006/0095700 | A1 * | 5/2006 | Sato et al. | 711/165 |
| 2006/0242290 | A1 * | 10/2006 | Ishizaki et al. | 709/223 |

OTHER PUBLICATIONS

IBM, "Hardware Management Console for pSeries Installation and Operations Guide (Eighth Edition)", http://publib.boulder.ibm.com/systems/hardware_docs/pdf1380590.pdf (Obtained from the Internet on Nov. 15, 2012) Nov. 2003, pp. 175-178.

* cited by examiner

| OPERATION | ATTRIBUTE A | ATTRIBUTE B | ATTRIBUTE C | ATTRIBUTE D | ATTRIBUTE E |
|---|---|---|---|---|---|
| OP 1 | FUNCA1 | FUNCB1 | FUNCC1 | FUNCD1 | FUNCE1 |
| OP 2 | FUNCA2 | FUNCB2 | FUNCC2 | FUNCD2 | FUNCE2 |
| OP 3 | FUNCA3 | FUNCB3 | FUNCC3 | FUNCD3 | FUNCE3 |
| OP 4 | FUNCA4 | FUNCB4 | FUNCC4 | FUNCD4 | FUNCE4 |
| OP 5 | FUNCA5 | FUNCB5 | FUNCC5 | FUNCD5 | FUNCE5 |

| OPERATION | MIN_MEM (NUMERIC DATA) | NAME (CHARACTER STRING) | IO_SLOT (SET) | AUTO_START (LOGICAL VALUE) | LPAR_ENV |
|---|---|---|---|---|---|
| MIN | SMALLER ONE | COMBINE WITH_MIN_ | PRODUCT OF BOTH | AND | ERROR IN THE CASE OF DISAGREEMENT |
| MAX | LARGER ONE | COMBINE WITH_MAX_ | SUM OF BOTH | OR | ERROR IN THE CASE OF DISAGREEMENT |
| PLUS | ADDITION | COMBINE WITH_PLUS_ | SUM OF BOTH | OR | ERROR IN THE CASE OF DISAGREEMENT |
| *NUMERIC VALUE | MULTIPLICATION | APPEND *NUMERIC VALUE (TO THE END OF THE NAME) | NOT CHANGED | NOT CHANGED | NOT CHANGED |
| MINUS | SUBTRACTION | COMBINE WITH_MINUS_ | USERFUNC | AND | ERROR IN THE CASE OF DISAGREEMENT |

LOGICAL PARTITION CONFIGURATION DATA FILE CREATION

FIELD OF THE INVENTION

The present invention relates to a system for processing data, and more particularly relates to a system for creating and editing data comprised of pairs of names and values of predetermined elements and a system and a method for creating a logical partition using the data.

BACKGROUND OF THE INVENTION

In recent years, backed by the improvement of hardware performance of computers, one computer is utilized by dividing it, into a plurality of logical partitions (for example, see Non-Patent Documents 1, 2). As a specific form, a Central Processing Unit (CPU), a memory, a storage medium such as a magnetic disk, a device such as a network interface or the like may be partitioned.

Such resources partitioned into a plurality of logical partitions can be used so that each logical partition can function as an individual computer. That is, in one computer, a plurality of Operating Systems (OS) and applications running on the OSs can be used in the respective logical partitions. Further, a failure occurring in an individual logical partition does not affect other logical partitions.

In general, a logical partition is defined by a data file (hereinafter called a configuration data file) comprised of pairs of names (attribute names) and values (attribute values) concerning each attributes assigned to the logical partition. In accordance with this configuration data file, a service processor provided in the computer divides and controls hardware resources such as a CPU, a memory and various devices.

[Non-Patent Document 1]
"AIX—logical partition (LPAR) and AIX 5L V5.2" written and edited by IBM Japan, Ltd. published by ASCII CORPORATION, Nov. 25, 2003

[Non-Patent Document 2]
"Hardware management console for pSeries, installation and operation guide" [online] IBM Japan, Ltd., (searched on Aug. 7, 2007), the Internet<URL: http://publibfi.boulder.ibm.com/epubs/pdf/a8868437.pdf>

SUMMARY OF THE INVENTION

A configuration data file comprised of with pairs of attribute names and attribute values are used not only for the definition of a logical partition but also for various systems. Conventionally, such a configuration data file is created by man power or using Graphical User Interface (GUI) that supports the work by man power. However, in the case where there are a large number (types) of attributes to be designated, the work is troublesome.

For instance, when a logical partition is created using a predetermined tool on a computer of IBM System pSeries, there is a need to designate a configuration data file defining the logical partition. Since this configuration data file is made up of a large number of attributes as follows, for example, it is not easy to create such a file:
name=rpa_11,Ipar_id=11,profile_name=p1_rpa11, Ipar_type=aixlinux,min_mem=128,desired_mem=256, $max_{13}$ mem=256,min_procs=1,desired_procs=1,max_procs=1, sharing_mode=share_idle_procs, proc_mode=ded, auto_start=1, io_slots="21030076/65535/1, 21040076/65535/1", max_virtual_slots=10

In view of the above-stated problems, it is an object of the present invention to provide a system capability of reducing the trouble required for creating and editing a configuration data file comprised of pairs of element names (attribute names) and element values (attribute values).

It is another object of the present invention to, when a resource of a computer is partitioned into a plurality of logical partitions, facilitate the creation of configuration data defining the logical partitions.

In order to achieve the above-stated objects, the present invention is composed as the following system. This system includes: a file storage unit that stores a configuration data file in which pairs of element names and element values are described concerning a respective predetermined element; a reception unit that receives a creation instruction of configuration data that designates a predetermined configuration data file stored in the file storage unit and an operation method; an operation unit that reads out the configuration data file designated by the creation instruction from the file storage unit, conducts an operation with respect to the element value for each element of the configuration data file in accordance with the operation method designated by the creation instruction, and creates a new configuration data file in which, for each respective elements, a pair of an element name which is identical to the one in the original configuration data file and an element value resulted from an operation is described; and an output unit that outputs the new configuration data created by the operation unit. Thus the new configuration data created may be stored in a file as a new configuration data file, or may be used by transferring to another system instead of storing it in a file.

Preferably, the system further includes a table storage unit that stores a table in which, for each operation method, contents of an operation to be conducted with respect to a respective element of the configuration data file is registered. The operation unit may refer to the table stored in the table storage unit concerning an operation method designated by the creation instruction, and conduct an operation registered in the table for a respective element of the configuration data file.

The system further may include a control unit that controls of an operation of a computer by partitioning resources of the computer into a plurality of logical partitions. The configuration data file may describe attributes of each logical partition of the computer as elements, the output unit may send the new configuration data created by the operation unit to the control unit, and the control unit may create a new logical partition based on the new configuration data received from the output unit to make the computer operate.

The present invention can be implemented in the following method as well. The method is for creating a logical partition for controlling an operation of a computer by partitioning resources of the computer into a plurality of the logical partitions, and includes the steps of: receiving a creation instruction of configuration data that designates configuration data files and an operation method, the configuration data files describing attributes of each logical partition as elements in the form of pairs of element names and element values of the elements; reading out the configuration data file designated by the creation instruction from storage means that stores the configuration data file of an already-existing logical partition; in accordance with the operation method designated by the creation instruction, conducting an operation with respect to the element value for a respective element of the read out configuration data file to create new configuration data describing, for each respective elements, a pair of an element name which is identical to the one in the original configuration data file and an element value resulted from an operation;

and creating, based on the created new configuration data, a new logical partition by control means of the computer.

The present invention further can be implemented as a program that implements the respective functions of the above-stated system by controlling a computer, or a program that makes a computer execute the processing corresponding to the respective steps of the above-described method. These programs may be delivered by storing them in a magnetic disk, an optical disk, a semiconductor memory and other recording media, or by distributing them via a network.

According to the present invention configured as stated above, already-existing configuration data files are utilized, whereby the trouble required for creating and editing a new configuration data file can be reduced. Further, the present invention is applied to create a configuration data file defining logical partitions of a computer, whereby a new logical partition is created easily by using a configuration data files of already-existing logical partitions.

BRIEF DESCRIPTION OF THE DRAWINGS

FIG. 2 shows exemplary contents of an operation table of the present embodiment;

FIG. 6 shows exemplary contents of an operation table applied to a control system of a computer.

DETAILED DESCRIPTION OF THE INVENTION

Figure 1:
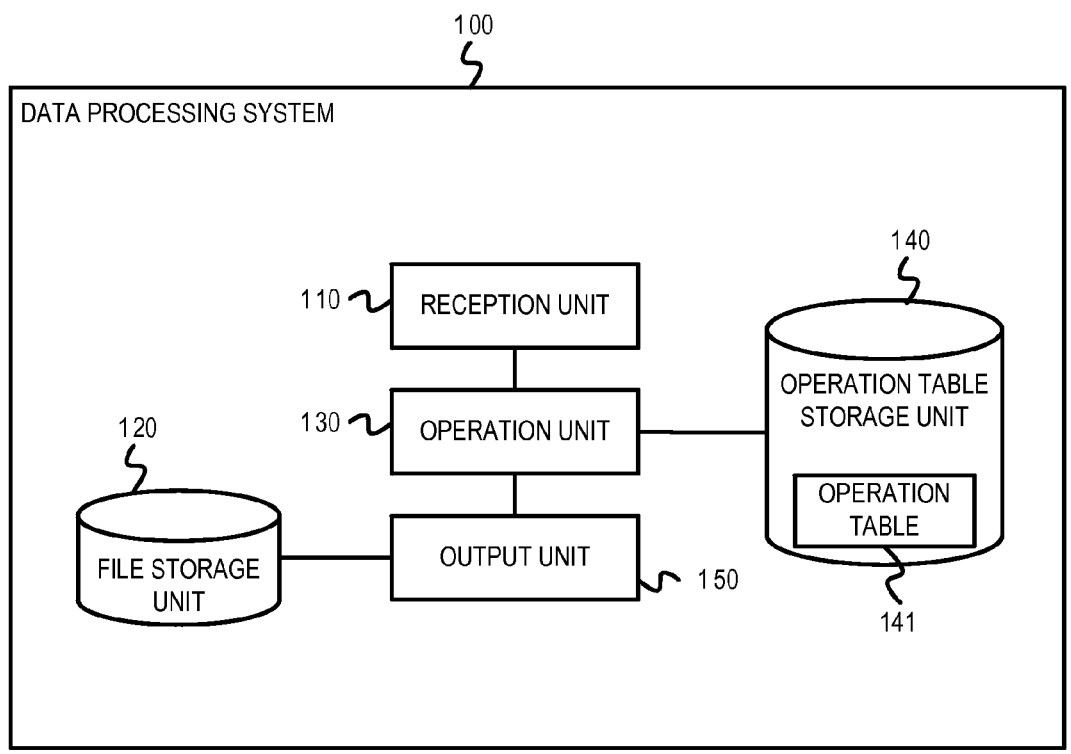
FIG. 1 shows a functional structure of a data processing system according to the present embodiment.

The following describes embodiments of the present invention in detail, with reference to the attached drawings.
<System Configuration>
FIG. 1 shows a functional structure of a data processing system according to the present embodiment.

A data processing system 100 of FIG. 1 includes a reception unit 110 that receives a creation instruction of a configuration data file and a file storage unit 120 that holds configuration data files. The data processing system 100 further includes an operation unit 130 that creates a configuration data, an operation table storage unit 140 that is used for the processing by the operation unit 130, and an output unit 150 that outputs created configuration data.

The reception unit 110 receives an input by a user to instruct the creation of configuration data and sends the input to the operation unit 130. In the present embodiment, configuration data is newly created using already-existing configuration data files. Thus, the instruction for creating a configuration data file includes already-existing configuration data files that become the foundation of the operation and information designating an operation method.

The file storage unit 120 stores and holds configuration data files. The configuration data file held in the file storage unit 120 is used by the operation unit 130 to create new configuration data. In the case where the new configuration data created by the operation unit 130 is stored in a file, such a file is stored in the file storage unit 120.

In accordance with the instruction to create configuration data received by the reception unit 110, the operation unit 130 creates a new configuration data file. The configuration data file is created using already-existing configuration data files stored in the file storage unit 120 and an operation table stored in the operation table storage unit 140, which will be described later.

The operation table storage unit 140 stores an operation table 141 that is used for the processing by the operation unit 130. The operation table 141 contains a "function name" for each element configuring a configuration data file, which is registered for searching a function applied as an operation between configuration data files.

FIG. 2 shows an exemplary contents of the operation table 141.

The operation table 141 of FIG. 2, as an example, contains five types of operations (op1 to op5) concerning five types of elements (A to E). The operation unit 130 refers to this operation table 141 and executes a function (func) set for each element to create a configuration data file. For instance, in the case where a configuration data file is created by operation op1, the operation is performed as in func A1 for element A, func B1 for element B and func C1 for element C. Each function takes on two arguments and returns one value or error, in which one of the arguments accepts the case of "no value".

In this operation table 141, it is defined what kind of function is to be executed for each operation and for all of the "element names" permitted as the configuration data. These "operation name", "element name" and "function name" can be added or changed, and if a new operation is to be added and if a new element name is added to the configuration data, the operation and the element name can be added and a function for a predetermined element can be changed to another function. Furthermore, in FIG. 2, each function is named based on the type of the element and the type of the operation (for example, the function of the operation "op1" for the element "A" is named the function "A1"). However, the entity of the function may be the same as that of another function (for example, the contents of func A1 and func A2 may be the same). Furthermore, the environment allowing a processing module to be loaded dynamically (for example, the environment using Java VM of Sun Microsystems Inc. in U.S.) may be used, whereby a function defined by a user can be designated as a "function name" in the operation table.

The output unit 150 causes a new configuration data, file created by the operation unit 130 to store in the file storage unit 120. The new configuration data file stored in the file storage unit 120 is used for the creation of the following configuration data as stated above.

Figure 3:
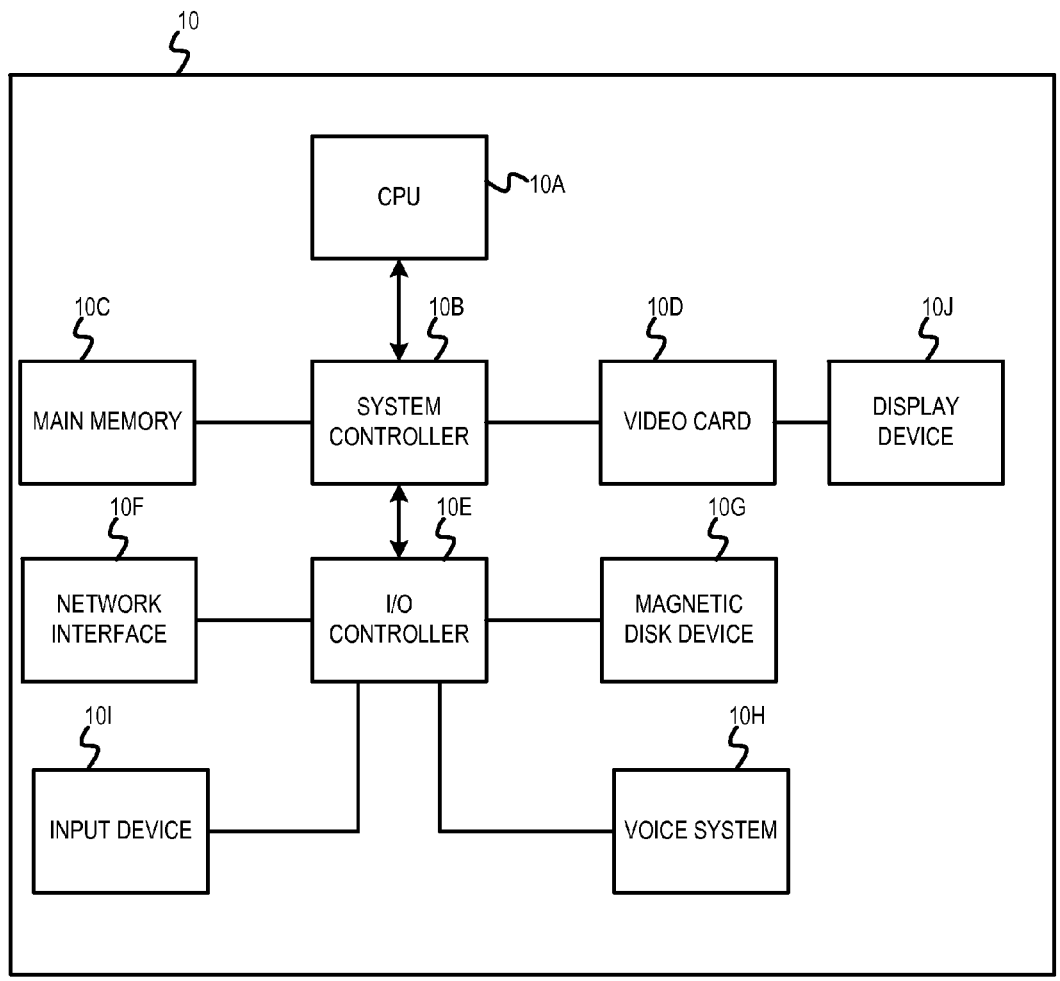
FIG. 3 shows exemplary components of a preferable computer for implementing the data processing system of the present embodiment.

FIG. 3 shows exemplary components of a preferable computer for implementing the data processing system 100.

A computer 10 of FIG. 3 includes a Central Processing Unit (CPU) 10a as operation means and a main memory 10c and a magnetic disk device (HDD: Hard Disk Drive) 10g as storage means. The computer 10 further includes a network interface 10f for the connection with an external device via a network, a video card 10d and a display device 10j for display output, and a voice system 10h for voice output. The computer 10 still further includes an input device 10i such as a keyboard and a mouse.

As shown in FIG. 3, the main memory 10c and the video card 10d are connected with the CPU 10a via a system controller 10b. The network interface 10f, the magnetic disk device 10g, the voice system 10h and the input device 10i are connected with the system controller 10b via an I/O controller 10e. The respective elements are connected via various buses such as a system bus and an input/output bus. For instance, the CPU 10a and the main memory 10c are connected via a system bus or a memory bus. The CPU 10a and the magnetic disk device log, the network interface 10f, the video card 10d, the voice system 10h, the input device 10i and the like are connected via an input/output bus such as Peripheral Components Interconnect (PCI), PCI express, serial At Attachment (ATA), Universal Serial Bus (USB), Accelerated Graphics Port (AGP).

Note that FIG. 3 simply illustrates a hardware components of a preferable PC to which the present embodiment is applied, and needless to say the illustrated configuration is not a limiting one. For instance, instead of having the video card 10d, having the video memory only and making the CPU 10a process image data would be another example. Alternatively, instead of having the voice system 10h independently, such a system may be provided as a function of a chip set configuring the system controller 10b or the I/O controller 10e. Alternatively, in addition to the magnetic disk device 10g, a drive of various optical disks and flexible disks as media may be provided as an secondary storage device. As the display device 10j, a liquid crystal display may be used mainly. However, any type of display may be used such as a CRT display or a plasma display.

In the data processing system 100 of FIG. 1, the reception unit 110 may be implemented by the input device 10i and the program-controlled CPU 10a of FIG. 3, for example.

The file storage unit 120 and the operation table storage unit 140 may be implemented by the storage means such as the main memory 10c and the magnetic disk device 10g of FIG. 3, for example.

The operation unit 130 and the output unit 150 may be implemented by the program-controlled CPU 10a of FIG. 3, for example. Programs that control the CPU 10a for implementing the functions of the reception unit 110, the operation unit 130 and the output unit 150 are stored in the magnetic disk device 10g, for example, which is read in the main memory 10c and is executed by the CPU 10a.

<Operation of Data Processing System 100>

The following describes how the operation unit 130 in the data processing system 100 performs data calculations.

In the following description, an element and an element value in the configuration data may be called an attribute (or attribute name) and an attribute value, respectively.

Figure 4:
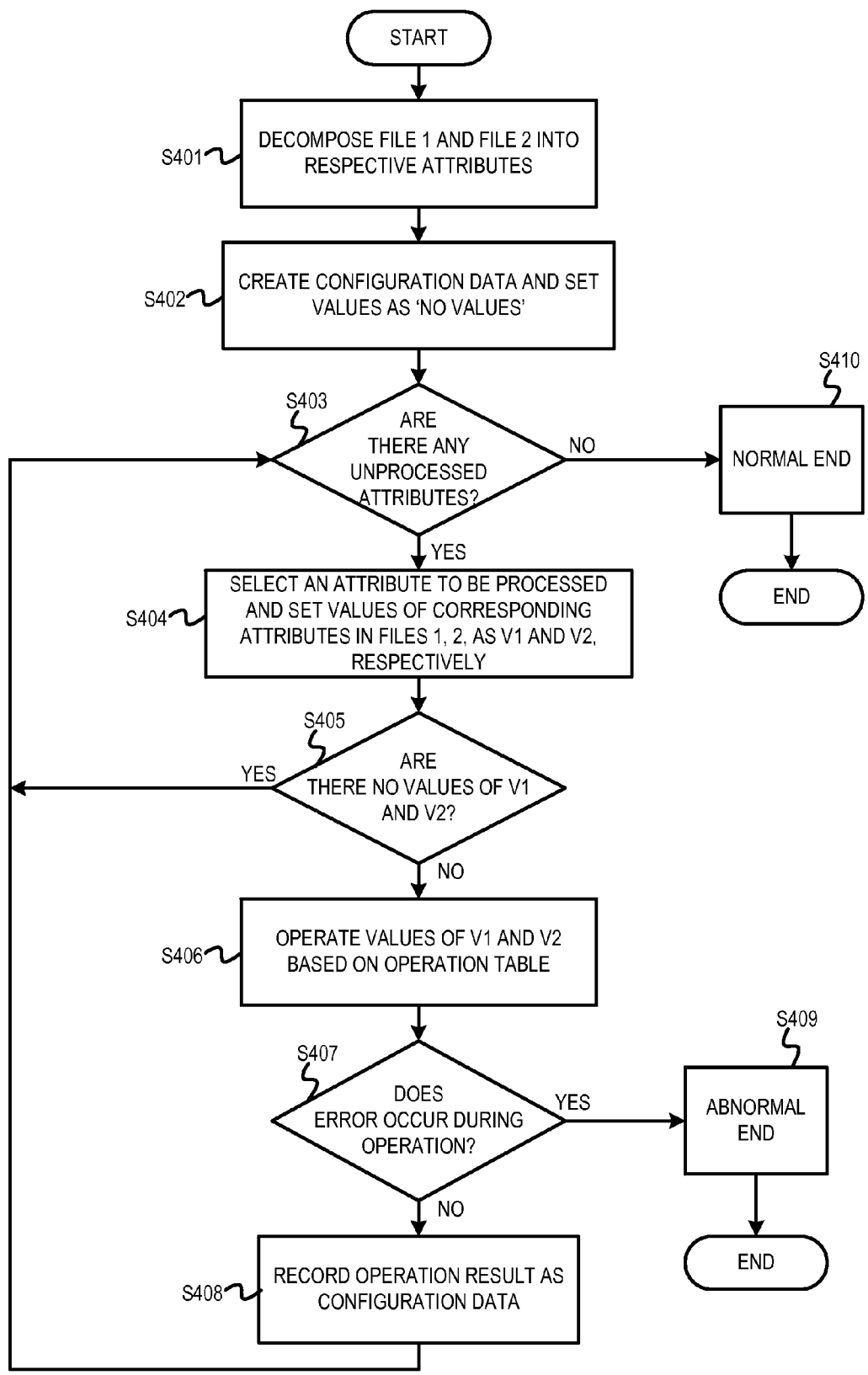
FIG. 4 is a flowchart which is visual representation of the sequence of how the operation unit performs data calculations in the present embodiment.

FIG. 4 is a flowchart which is visual representation of the sequence of how the operation unit 130 performs data calculations in the present embodiment.

As the initial operation, it is assumed that the reception unit 110 receives the input of a creation instruction that designates already-existing configuration data files and an operation method used for the creation of a configuration data file, which is sent to the operation unit 130. Herein, it is assumed that File 1 and File 2 are designated as the already-existing files and op1 is designated as the operation method. Although it is expected that the already-existing configuration data files contain each of the elements registered in the operation table 141, they do not always have values for all of the elements.

When receiving the creation instruction of configuration data, the operation unit 130 reads out File 1 and File 2 designated by this creation instruction from the file storage unit 120, and decomposes them into respective elements (Step 401). Further, the operation unit 130 creates new configuration data, and sets all values of the elements as "no value" as the initial setting (Step 402).

Next, the operation unit 130 judges whether there are any unprocessed elements are left or not (Step 403). If there are unprocessed elements, the operation unit 130 selects one of them to make it the element Attr, and extracts values corresponding to the element Attr from File 1 and File 2 to make them v1 and v2, respectively (Step 404). At this time, if a value corresponding to the element Attr does not exist, "no value" is set. If both of File 1 and File 2 have "no values", an operation cannot be conducted with respect to this element Attr, and therefore the process returns to Step 403, where the next unprocessed element is selected and similar processing is performed thereto (Step 405).

If at least one of File 1 and File 2 has a value corresponding to the element Attr (v1 or v2), the operation unit 130 conducts the operation using the function registered in the operation table 141 (Step 406). If an error occurs during the operation, error notification or the like is performed as abnormal end, and the process ends (Steps 407, 409).

On the other hand, if the operation ends without any error, a value of the obtained operation result is recorded as the corresponding element in the configuration data created at Step 402 (Steps 407, 408). Note that in the case where an error does not occur but a value cannot be obtained as the operation result, "no value" is set for the element. Thereafter, the process returns to Step 403, and the processing is repeated until no unprocessed element is left. When processing has been made for all of the elements, a user is notified of the end of the processing as normal end, and the process ends (Step 410).

<Application Example>

Next, a specific application example of the data processing system 100 of the present embodiment will be described below. The following describes an example in which the data processing system 100 is applied to a control system for dividing a hardware resource of a computer into a plurality of logical partitions.

Figure 5:
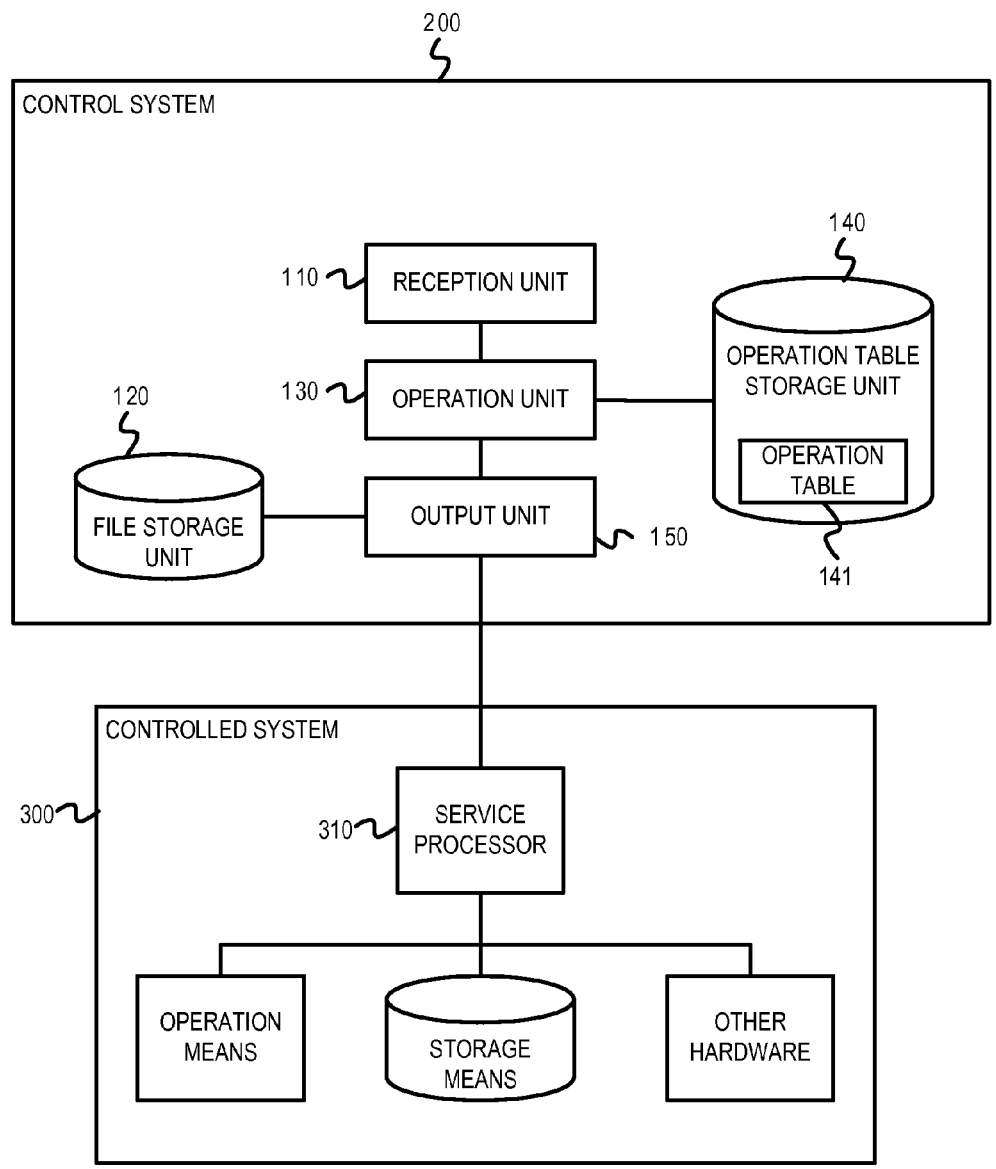
FIG. 5 shows the structure of a control system of a computer to which the data processing system of the present embodiment is applied.

FIG. 5 shows the structure of a control system of a computer to which the data processing system 100 of the present embodiment is applied.

In FIG. 5, a control system 200 and a controlled system 300 are implemented by the computer 10 of FIG. 3, for example. The control system 200 has functions similar to that of the data processing system 100 of FIG. 1. The controlled system 300 includes a service processor 310 mounted thereon, the service processor 310 allowing each logical partitions of a hardware resource of the controlled system 300 to actually operate independently. An example of the controlled system 300 includes a computer of IBM System pSeries.

A file storage unit 120 of the control system 200 stores a configuration data file that defines a logical partition by describing attributes of the logical partition as elements to be represented in the form of names and values. That is, this configuration data file is configured with pairs of attribute names and values concerning attributes of a logical partition. The configuration data file defining a logical partition is created based on an already-existing configuration data file stored in the file storage unit 120. However, the creation instruction of the configuration data file can also be made by partition profile, partition name which is already activated, and all of the resources of the controlled system 300, "ALL". In the case where "ALL" or the like is designated other than file names, such data is collected at that time from the controlled system 300 using already-existing commands. If "ALL" is designated, a logical partition which has all of the resources of the controlled system 300 will be assumed. Then, an operation will be conducted using the configuration data file defining the logical partition and a configuration data file defining another already-existing logical partition.

Types of the data in the configuration data file include numeric data, a character string, a set, a logical value (true/false or 1/0) a type name and the like. An example of an attribute taking on numeric data includes a memory size ("min_mem" representing a minimum memory size, "max_mem" representing a maximum memory size, or the like). An example of an attribute taking on a character string includes a logical partition name "Ipar_name", and a profile_name "profile_name". As an example of an attribute taking on a set includes an I/O slot "io_slot". As an example of an attribute taking on a logical value includes auto-start "auto_start" and "all_resources" representing all of the resources. As an example of an attribute taking on a type name includes "Ipar_env" representing a operating system for a logical partition.

The operation table storage unit 140 stores an operation table 141 in which operations used for creating a logical partition are registered.

FIG. 6 shows an exemplary configuration of the operation table 141 stored in the operation table storage unit 140 of the control system 200.

In the operation table 141 of FIG. 6, five types of operations are registered, including "MIN", "MAX", "PLUS", "*numeric value" and "MINUS". Further, five types of attributes are registered, including "min_mem", "name", "io_slot", "auto_start" and "Ipar_env".

According to the operation table 141 of FIG. 6, in the case where the operation "MIN" is conducted between configuration data files, a smaller value is adopted in the operation of the attribute "min_mem (numeric data)". In the operation of the attribute "auto_start (logical value)", the processing of AND (logical multiplication) is conducted.

In the case where the operation "PLUS" is conducted, a character string obtained by combining two character strings with "_PLUS_" is created in the operation of the attribute "name (character string)". If values are not same in the attribute "Ipar_env (type name)", the operation "PLUS" as a whole becomes an error.

In the case where the operation "numeric value" is conducted with respect to a predetermined configuration data file, the current value of the configuration data file is multiplied by a numeric value designated by "*numeric value" in the operation of the attribute "min_mem (numeric data)".

The reception unit 110 receives the creation instruction of configuration data in which logical partitions and an operation used are designated as follows:

For instance, in the case where a new logical partition is created corresponding to the combination of two already-existing logical partitions (configA and configB), the instruction will be:
    configA+configB In the case where the logical partition configA already exists and new logical partition needs to have all of the remaining resources of the controlled system 300, the instruction will be:
    ALL−configA In the case where a logical partition is created for using the capability of the CPU and the storage capacity of the memory 1.5 times those of the already-existing logical partition configA, the instruction will be:
    configA*1.5

In the above relationships, "config A" and "config B" are file names of the configuration data defining logical partitions. "+" represents the operation "PLUS" of the operation table 141 of FIG. 6, "−" represents the operation "MINUS" of the operation table 141, and "*1.5" represents the operation "*numeric value" of the operation table 141.

In the case where a logical partition is created on IBM System pSeries, for example, conventionally only one file can be designated using mksyscfg command as in:
    mksyscfg−r Ipar−m machine1−f configA On the other hand, with the above configuration, the operation of two files can be designated as in:
    mksyscfg−r Ipar−m machine1−f "configA+configB"

The output unit 150 outputs new configuration data as the operation result by the operation unit 130. In the case of FIG. 5, this new configuration data is not stored in the file storage unit 120, but is sent to the service processor 310 mounted in the controlled system 300. The service processor 310 creates a new logical partition actually based on the received configuration data, so as to control the use of the hardware resource of the controlled system 300.

The following describes a specific calculation example.

It is assumed that two logical partitions exist, which are defined by the following configuration data files:
    File1:name=Ipar1, Ipar_env=aixlinux, min_mem=128, auto_start=1
    File2:name=Ipar2, Ipar_env=aixlinux, min_mem=512, auto_start=0

In the case where these configuration data files are designated and the operation "MIN" is conducted with respect to File1 and File2 as a target, the following operation result will be obtained:
    Data:name=Ipar1_MIN_Ipar2, Ipar_env=aixlinux, min_mem=128, auto_start=0

Referring to Data as the operation result, the operation in accordance with the operation table 141 of FIG. 6 is conducted. That is, as for the attribute name, Ipar1 of File1 and Ipar2 of File2 are combined with "_MIN_". As for the attribute Ipar_env, it is the same as the attribute value of File1 and File2. As for the attribute min_mem, a smaller value 128 is adopted between the attribute values of File1 and File2. As for the attribute auto_start, AND (logical multiplication) of the attribute values of File1 and File2 is obtained, which is 0.

Another calculation example will be described below. It is assumed that File1 and File2 is defied as follows:
    File1:name=Ipar1, Ipar_env=aixlinux, min_mem=128, auto_start=1, io_slots=21020003/none/1,21020004/none/1
    File2:name=Ipar2, Ipar_env=aixlinux, min_mem=512, auto_start=0, io_slots=21020003/none/1,21020001/none/1

In the case where these configuration data files are designated and the operation "MAX" is conducted with respect to File1 and File2 as a target, the following operation result will be obtained:
    Data: name=Ipar1_MAX_Ipar2, Ipar_env=aixlinux, min_mem=512, auto_start=1, io_slots=21020003/none/1, 21020004/none/1,21020001/none/1

In the operation result, as for the attribute min_mem, a larger value 512 between the attribute values of File1 and File2 is adopted. As for the attribute auto_start, OR (logical sum) of the attribute values of File1 and File2 is obtained, which is 1. As for the attribute io_slot, the sum of the attribute values of File1 and File2 is obtained.

On the other hand, when the operation "MINUS" is conducted with respect to the same File1 and File2, the following operation result will be obtained:
    Data: name=Ipar1_MINUS_Ipar2, Ipar_env=aixlinux, min_mem=384, auto_start=0, io_slots=21020004/none/1, 21020001/none/1

In the operation result, as for the attribute min_mem, a smaller value of the attribute values of File1 and File2 is subtracted from a larger one, which is 384. As for the attribute io_slot, 21020004/none/1 and 21020001/none/1 are adopted by the function (UserFunc) which is defined by the user.

Although that is the description of an example in which the present embodiment is applied to the creation of a logical partition, the present embodiment can be applied to the creation of partition profile, system profile or the like as well. Further, the present embodiment can be applied generally to create new configuration data by the operation of configuration data files configured with a pair of attribute names and attribute values.

According to the present embodiment, new configuration data can be easily created using an already-existing configuration data files. Thereby, the trouble required for creating a configuration data file and a logical partition defined by the configuration data file can be significantly reduced. Further, since a configuration data file configured with pairs of attribute names and attribute values is generally used in various systems, to create new configuration data using (operating) an already-existing configuration data file can be applied to these various systems as well.

The invention claimed is:

1. A system, comprising:
a central processor;
a network interface;
an I/O controller;
a file storage unit that stores logical partition configuration data files in which pairs of element names and element values are described concerning respective predetermined elements that correspond to logical partitions;
a reception unit configured to receive a creation instruction of configuration data that designates a first and a second of the logical partition configuration data files stored in the file storage unit and an operation indication;
an operation unit configured to read out the first and the second logical partition configuration data files designated by the creation instruction from the file storage unit, to conduct operations on the element values for each of the elements occurring in both the first logical partition configuration data file and the second logical partition configuration data file, and to create a new logical partition configuration data file based on conducting the operations, wherein the operations differ based on type of the elements; and
an output unit configured to output the new logical partition configuration data file created by the operation unit.

2. The system according to claim 1, further comprising a table storage unit that stores a data structure that specifies a plurality of operation methods, and, for each different type of element, a different operation.

3. The system according to claim 1, wherein the operation indication indicates a mathematical operation, a logical operation, a select maximum operation, or a select minimum operation.

4. The system according to claim 1, wherein the elements represent attributes of a logical partition.

5. The system according to claim 1, wherein the output unit is further configured to output the new logical partition configuration data file from into the file storage unit.

6. The system according to claim 1, further comprising a program executable by the processor to cause the processor to create a new logical partition with the new logical partition configuration data file.

7. The system of claim 1, wherein the operation unit configured to conduct operations on the element values for each of the elements occurring in both the first logical partition configuration data file and the second logical partition configuration data file comprises the operation unit being configured to:

for each of the elements occurring in both the first logical partition configuration data file and the second logical partition configuration data file,
determine one of the operations specified for the type of the element for the operation method; and
apply the operation to the element values for the element as described by the first logical partition configuration data file and the second logical partition configuration data file.

8. The system of claim 7, wherein the operation unit is further configured to generate an indication of no value for an element value of the new logical partition configuration data file if no error occurs but no value can be obtained when the operation is applied to corresponding ones of the element values of the first and the second logical partition configuration data files.

9. The system of claim 1, wherein the operation unit is further configured to decompose each of the first and the second logical partition configuration data files into the pairs of element names and element values before conducting the operations.

10. A method comprising:
receiving a creation instruction of configuration data that designates a first logical partition configuration data file, a second logical partition configuration data file, and an operation indication, the first logical partition configuration data file and the second logical partition configuration data file describing attributes of logical partitions as elements in the form of pairs of element names and element values of the element;
reading the first and the second logical partition configuration data files;
in accordance with the operation method designated by the creation instruction, conducting operations the element values for each of the elements occurring both the first and the second logical partition configuration data files to create a new logical partition configuration data file, wherein the operations differ based on types of the elements; and
creating, based on the new logical partition configuration data file, a new logical partition.

11. The method according to claim 10 further comprising accessing a data structure with the operation indication and types of the elements to determine the operations, wherein the data structure comprises a plurality of operation indications and specifies a set of operations based on element types for each of the plurality of operation indications.

12. The method according to claim 10, wherein the operation indication indicates a mathematical operation, a logical operation, a select maximum operation, or a select minimum operation.

13. The method of claim 10, wherein said conducting operations on the element values for each of the elements occurring in both the first logical partition configuration data file and the second logical partition configuration data file comprises:

for each of the elements occurring in both the first logical partition configuration data file and the second logical partition configuration data file,
determining one of the operations specified for the type of the element for the operation method; and
applying the operation to the element values for the element as described by the first logical partition configuration data file and the second logical partition configuration data file.

14. The method of claim 13 further comprising generating an indication of no value for an element value of the new logical partition configuration data file if no error occurs but no value can be obtained when the operation is applied to corresponding ones of the element values of the first and the second logical partition configuration data files.

15. A computer-readable storage medium having a program for creating a logical partition configuration data encoded therein, the program comprising program instructions to:
    receive a creation instruction of configuration data that designates a first and a second logical partition configuration data files and an operation vindication, wherein the first and the second logical partition configuration data files describe attributes of logical partitions as elements in the form of pairs of element names and element values of the elements,
    read the first and the second logical partition configuration data files,
    conduct an operations with the element value for each of the elements occurring in both the first and the second logical partition configuration data files to create a new logical partition configuration data file; and
    send the created new logical partition configuration data file to create a logical partition defined by the new logical partition configuration data file.

16. The computer-readable storage medium according to claim 15, wherein the program further comprises program instructions to access a data structure with the operation indication and types of the elements to determine the operations, wherein the data structure comprises a plurality of operation indications and specifies a set of operations based on element types for each of the plurality of operation indications.

17. The computer-readable storage medium according to claim 15, wherein the operation indication indicates a mathematical operation, a logical operation, a select maximum operation, or a select minimum operation.

18. The computer-readable storage medium of claim 15, wherein the program instructions to conduct operations on the element values for each of the elements occurring in both the first logical partition configuration data file and the second logical partition configuration data file comprises program instructions to:
    for each of the elements occurring in both the first logical partition configuration data file and the second logical partition configuration data file,
        determine one of the operations specified for the type of the element for the operation method; and
        apply the operation to the element values for the element as described by the first logical partition configuration data file and the second logical partition configuration data file.

19. The computer-readable storage medium of claim 18, wherein the program instructions further comprise program instructions to generate an indication of no value for an element value of the new logical partition configuration data file if no error occurs but no value can be obtained when the operation is applied to corresponding ones of the element values of the first and the second logical partition configuration data files.

* * * * *